T. SHAW.

Assignor by mesne assignments to P. S. JUSTICE.

POWER HAMMER.

No. 7,475. Reissued Jan. 23, 1877.

Witnesses:
Wm. Hughes
Wm. Garwood

Thomas Shaw
P. S. Justice, assignee
by Thos Shaw
atty.
Inventor:

N. PETERS, PHOTO-LITHOGRAPHER, WASHINGTON, D. C.

UNITED STATES PATENT OFFICE.

THOMAS SHAW, OF PHILADELPHIA, PENNSYLVANIA, ASSIGNOR, BY MESNE ASSIGNMENTS, TO PHILIP S. JUSTICE, OF SAME PLACE.

IMPROVEMENT IN POWER-HAMMERS.

Specification forming part of Letters Patent No. 52,894, dated February 27, 1866; reissue No. 2,398, dated November 27, 1866; reissue No. 7,475, dated January 23, 1877; application filed August 5, 1876.

*To all whom it may concern:*

Be it known that THOMAS SHAW, of the city and county of Philadelphia, Pennsylvania, did invent a new and Improved Mode of Constructing and Operating Power-Hammers; and the following is a full, clear, and exact description of the same, reference being had to the accompanying drawings, and to the letters of reference marked thereon.

The said invention of said SHAW consists in suspending a hammer to a plate-spring, which is found to have great durability, in contradistinction to a spiral spring, which is very liable to early fracture by the severe torsional strains of a vibrating hammer that has connection with a crank in such a manner that the hammer is both lifted from, and forced down upon, the anvil by the united action of crank and spring, as hereinafter described; also, in the provision of flexible connection, to absorb the destructive vibration of hammer, to prevent the destructive effect upon the machinery.

The object of the invention is the construction of a compact and durable forging-machine, capable of running at high speeds, thus giving the hammer a velocity and force that insures good work and rapid execution.

In order to enable others to use and practice the said invention, its construction and operation will now be described.

Figure 2:
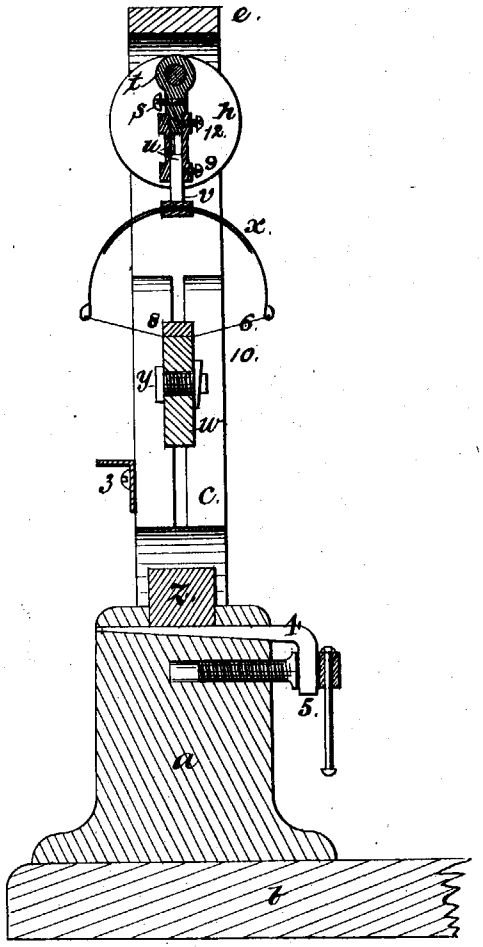
Figure 1:
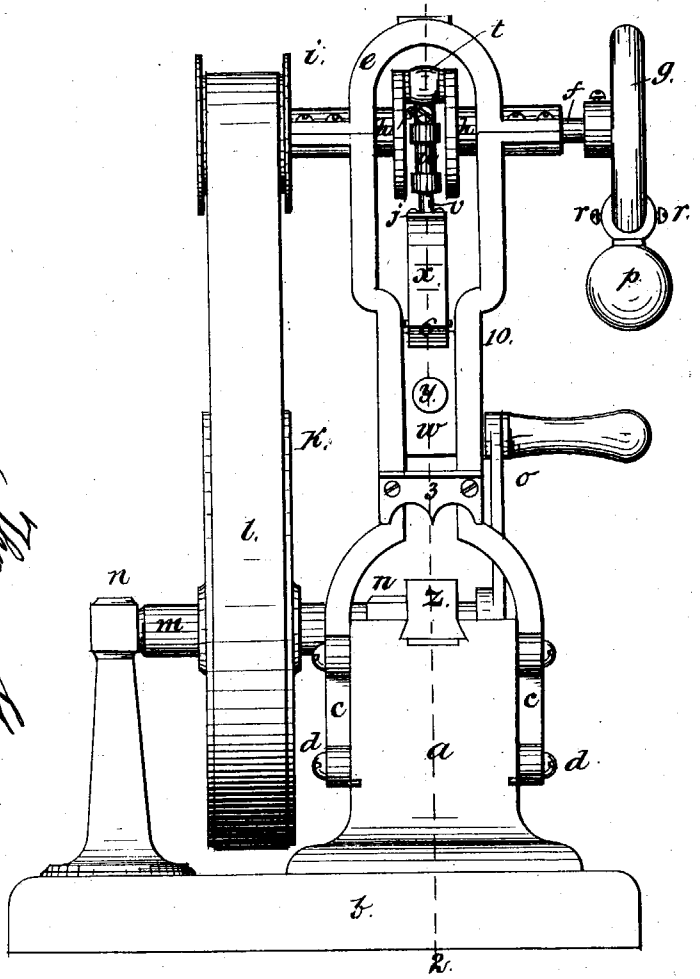

On reference to the accompanying drawings, which form a part of this specification, Figure 1 is a front view. Fig. 2 is a vertical section on the line 1 2.

Similar letters refer to similar parts throughout the several views.

*a* is the anvil-block, secured to wood base *b* by screws. *c c* are guide-rods, extending up to cap *e*, to which they are united by means of screws, and at which point is formed the journal-bearings for shaft *f*, for the purpose as hereafter described. Said guide-rods *c c* are secured to anvil *a* by means of screws *d d*. *n n* are two pillars, supporting shaft *m*, to which is secured the main driving-pulley *k* and crank *o*, for the purpose of communicating power to the hammer, through belt *l*, when said crank *o* is operated by the hand. Crank-shaft *f* has secured to it, and carries fly-wheel *g*, counter-balance *p*, crank-disks *h h*, and belt-wheel *i*, for the purposes hereafter described. *x* is a metallic spring, secured to rod *v*, which enters the hollow sleeve *u*, and to which it is secured by set-screw 9. The upper end of the hollow rod *u* has a split-box journal-bearing, *t*, held together by screw *s*, that embraces the crank-pin. Screw 12 secures the rod *u* to journal-box. *w* is the hammer, secured on its upper end to belt 6 by wedge 8. Said belt is secured to spring *x* by means of screws J, all for the purpose as hereafter described. 3 is a shield to prevent heat from burning the belt. *z* is the die, secured to anvil *a* by means of wedge 4 and screw 5, as hereafter described. The hammer *w* can be made to strike high or low by lengthening or shortening the rod *v* by screw 9. The weight of hammer can be regulated by means of plug *y*, inserted into or taken from the hammer, which alters the weight in proportion. In order to prevent the plug from unscrewing itself pin 10 is inserted. Spring *x* and belt 6, in combination with crank-pin and rod *u*, give the hammer a free and elastic motion. The device is also durable, as the belt prevents the sudden vibration of the hammer from being transmitted to the machinery. The wedge 4 secures the die *z*, by being forced under it by means of screw 5.

The object of counter-balance *p* is to lift the hammer off the anvil-block when stopping. This can also be effected by means of a spring pulling in the desired direction on a crank-pin.

The hammer is put in operation in this wise: On motion being applied to crank *o* motion will be communicated to crank-shaft *f* through belt *l*, when the hammer *w* will have imparted to it a perpendicular vibratory motion of twice the stroke of the crank, more or less, according to speed of hammer.

This construction insures a constant and firm connection of flexible material between the hammer and the running-gear, whereby an excess of motion and force is imparted to the hammer, causing the hammer to travel double the distance of the mechanism, imparting the motion without losing firm connection with any part of the running-gear.

The hammer can be adjustd to high and low work by means of the adjustable rod *v* entering sleeve *u*, and is held firmly in position by screw 9. The shaft *f* is located at the top of the machine for the purpose of enabling forging to be done on both sides of the hammer.

It will be evident that the several parts of this machine can be variously modified without any alteration in the result.

What is claimed as the invention of said SHAW, and desired to be secured by Letters Patent, is—

1. The combination of a plate-spring, *x*, of flexible material, with the hammer *w* and crank-pin, for the purpose of forcibly vibrating the hammer, by the rotating crank-pin, without the danger of destroying the intervening spring, substantially as set forth.

2. The belt 6, in combination with hammer *w* and spring *x*, for the purpose set forth.

3. The adjustable sleeve *u*, in combination with hammer *w*, spring *x*, and the crank-pin, for the purpose described.

4. The crank-shaft *f*, in combination with hammer *w*, spring *x*, and connecting-rod *u*, all for the purpose substantially as set forth.

PHILIP SYNG JUSTICE.

Witnesses:
E. COBB,
P. M. GETTIGAN.